US012061692B2

(12) United States Patent
Paranjape

(10) Patent No.: US 12,061,692 B2
(45) Date of Patent: Aug. 13, 2024

(54) METHODS AND SYSTEMS FOR FINGERPRINTING MALICIOUS BEHAVIOR

(71) Applicant: BlackBerry Limited, Waterloo (CA)

(72) Inventor: Sameer Shashikant Paranjape, Portland, OR (US)

(73) Assignee: Cylance Inc., Irving, TX (US)

( * ) Notice: Subject to any disclaimer, the term of this patent is extended or adjusted under 35 U.S.C. 154(b) by 330 days.

(21) Appl. No.: 17/551,537

(22) Filed: Dec. 15, 2021

(65) Prior Publication Data

US 2023/0185906 A1    Jun. 15, 2023

(51) Int. Cl.
G06F 21/55 (2013.01)
G06F 18/214 (2023.01)
G06F 18/2433 (2023.01)
G06N 20/20 (2019.01)

(52) U.S. Cl.
CPC ........ *G06F 21/552* (2013.01); *G06F 18/2148* (2023.01); *G06F 18/2433* (2023.01); *G06N 20/20* (2019.01)

(58) Field of Classification Search
CPC .............. G06F 21/552; G06F 18/2148; G06F 18/2433; G06N 20/20
See application file for complete search history.

(56) References Cited

U.S. PATENT DOCUMENTS

| 11,853,853 | B1* | 12/2023 | Beauchesne | ........ G06F 18/2133 |
| 2007/0294768 | A1 | 12/2007 | Moskovitch et al. | |
| 2010/0287128 | A1* | 11/2010 | Baltatu | ............... G06F 18/2433 |
| | | | | 709/224 |
| 2011/0267964 | A1* | 11/2011 | Baltatu | ............... H04L 63/1425 |
| | | | | 370/242 |

(Continued)

OTHER PUBLICATIONS

Khraisat Ansam et al: 'Hybrid Intrusion Detection System Based on the Stacking Ensemble of C5 Decision Tree Classifier and One Class Support Vector Machine', Electronics, Special Issue Machne Learning Techniques for Intelligent Intrusion Detection Systems, [Online] vol. 9, No. 1, Jan. 17, 2020 (Jan. 17, 2020), p. 173, XP093037141.

(Continued)

*Primary Examiner* — Techane Gergiso
(74) *Attorney, Agent, or Firm* — Rowand LLP

(57) ABSTRACT

Methods and systems for fingerprinting a malicious behavior. In a first stage of training, a coarse machine learning one-class classifier is trained to detect a first dataset of events, the first dataset of events including a dataset of events representing a malicious behavior and a dataset of events representing non-malicious behavior and a benign machine learning one-class classifier is trained to detect a second dataset of events, the second dataset of events excluding the dataset of events representing malicious activity. An ensemble of models including the benign and coarse machine learning one-class classifiers is applied to the first dataset of events to create a third training set representing the malicious behavior for a second stage of training. A final machine learning one-class classifier is trained in the second stage of training using the third training set. The final machine learning one-class classifier represents a fingerprint of the malicious behavior.

20 Claims, 8 Drawing Sheets

(56) References Cited

U.S. PATENT DOCUMENTS

| | | | |
|---|---|---|---|
| 2016/0188396 A1* | 6/2016 | Sonalker | G06F 11/079 |
| | | | 714/37 |
| 2020/0007249 A1* | 1/2020 | Derr | G06N 3/045 |
| 2020/0051550 A1 | 2/2020 | Baker | |
| 2020/0067935 A1* | 2/2020 | Carnes, III | H04L 63/101 |
| 2020/0285958 A1* | 9/2020 | Abad | G06N 3/045 |
| 2021/0281592 A1* | 9/2021 | Givental | G06N 20/10 |
| 2021/0344695 A1 | 11/2021 | Palani et al. | |
| 2021/0406896 A1* | 12/2021 | Chaturvedi | G06Q 20/405 |
| 2022/0086064 A1* | 3/2022 | Sivaraman | H04L 47/2483 |
| 2022/0261641 A1* | 8/2022 | Yamamoto | G06N 3/045 |
| 2023/0071394 A1* | 3/2023 | Roychowdhury | G05B 23/0243 |
| 2023/0161337 A1* | 5/2023 | Satou | G06N 20/00 |
| | | | 700/47 |

OTHER PUBLICATIONS

Extended European Search report dated Apr. 18, 2023, Application No. 22210833.4.
The MITRE Corporation; Enterprise tactics; Oct. 21, 2021; https://web.archive.org/web/20211021193503/https://attack.mitre.org/tactics/enterprise/.
International Search Report & Written Opinion dated Jan. 18, 2023; WIPO: Application No. PCT/CA2022/051575.

* cited by examiner

METHODS AND SYSTEMS FOR FINGERPRINTING MALICIOUS BEHAVIOR

FIELD

The present application generally relates to neural networks and, more particularly, to training a neural network based on impure data.

BACKGROUND

Anomaly detection is of critical importance across many domains, including malware detection, video surveillance, and network monitoring.

In the anomaly detection domain, approaches for training a neural network model to detect an anomaly typically depend on unsupervised learning models that require a huge dataset for training. These models may not be robust due to the significant amount of noise that may exist in these huge datasets. In addition, processing huge datasets may also require significant amounts of computing resources.

It would be advantageous to provide for enhanced robustness of neural network models and more efficient systems and methods for training neural network models.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
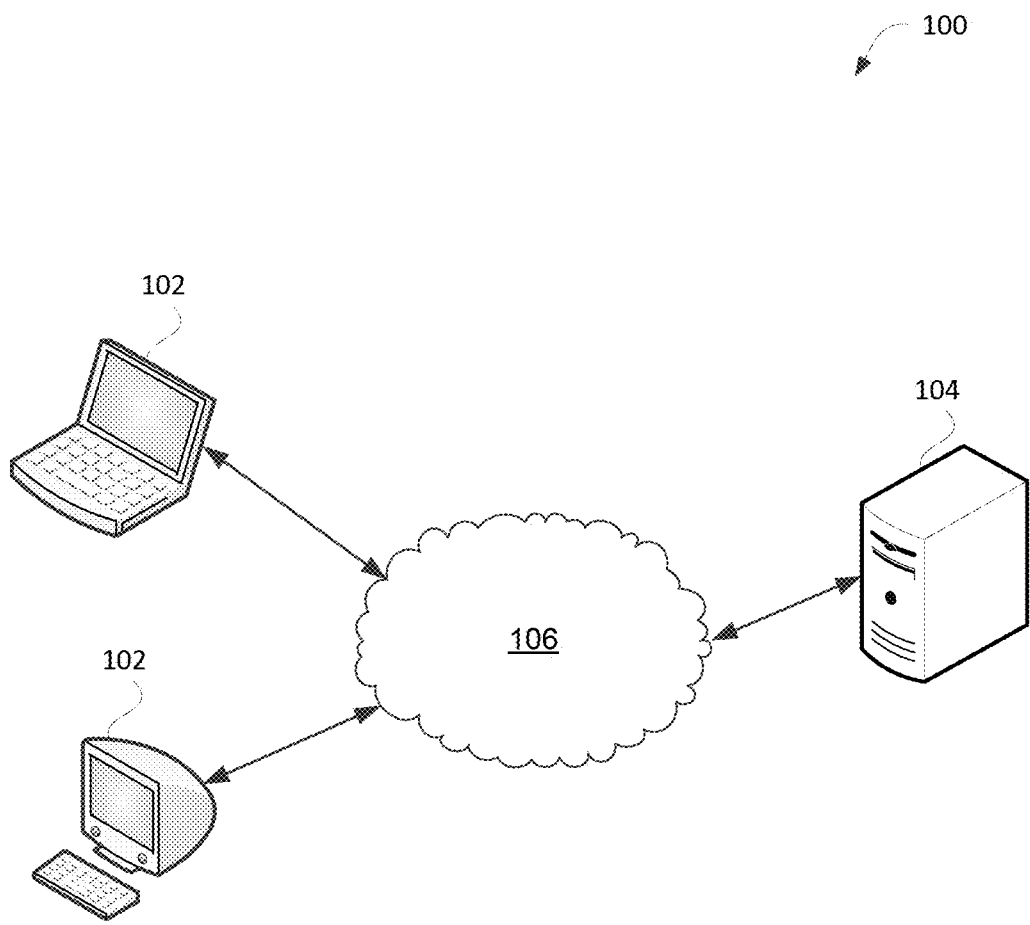
FIG. 1 shows a schematic diagram illustrating an operating environment of an example embodiment.

In a first aspect, the present application describes a computer-implemented method of training a neural network. The method may include, in a first stage of training, training a coarse machine learning one-class classifier using a first training set including a signal and noise; and training a noise machine learning one-class classifier using a second training set excluding the signal; applying an ensemble of models including the noise machine learning one-class classifier and the coarse machine learning one-class classifier to the first training set to create a third training set representing the signal for a second stage of training; and training a final machine learning one-class classifier in the second stage of training using the third training set representing the signal.

In some implementations, the final machine learning one-class classifier may include an auto-encoder-decoder.

In some implementations, the final machine learning one-class classifier may include a long short-term memory auto-encoder-decoder.

In some implementations, the third training set representing the signal may include information detectable by the coarse classifiers but not detectable by the noise classifier.

In some implementations, applying the ensemble of models may include identifying data points detectable by the coarse classifier but not detectable by the noise classifier; and aggregating the identified data points to create the third training set representing the signal.

In some implementations, the final machine learning one-class classifier may be capable of detecting, or configured to detect, the signal in information collected using a first operating system different from a second operating system used to collect the second training set excluding the signal.

In some implementations, the first stage of training may include training each particular classifier in a plurality of coarse machine learning one-class classifiers using a respective training set in a plurality of training sets, wherein each particular training set in the plurality of training sets may include the signal and noise and wherein the plurality of coarse machine learning one-class classifiers may include the coarse machine learning one-class classifier and the plurality of training sets may include the first training set, and the ensemble of models may include the plurality of coarse machine learning one-class classifiers.

In some implementations, the method may further include applying the ensemble of models to the plurality of training sets to create the third training set representing the signal for the second stage of training, wherein applying the ensemble of models to the plurality of training sets includes applying the ensemble of models to the first training set.

In some implementations, applying the ensemble of models to the plurality of training sets may include applying each particular classifier in the plurality of coarse machine learning one-class classifiers to each particular training set in the plurality of training sets; and applying the noise machine learning one-class classifier to each particular training set in the plurality of training sets.

In another aspect, there may be provided a system for training a neural network. The system may include a processor and a memory coupled to the processor and storing processor-readable instructions that, when executed, cause the processor to, in a first stage of training, train a coarse machine learning one-class classifier using a first training set including a signal and noise; and train a noise machine learning one-class classifier using a second training set excluding the signal; apply an ensemble of models including the noise machine learning one-class classifier and the coarse machine learning one-class classifier to the first training set to create a third training set representing the signal for a second stage of training; and train a final machine learning one-class classifier in the second stage of training using the third training set representing the signal.

In some embodiments, the processor may be further configured to, in the first stage of training, train each particular classifier in a plurality of coarse machine learning one-class classifiers using a respective training set in a plurality of training sets, wherein each particular training set in the plurality of training sets may include the signal and noise, wherein the plurality of coarse machine learning one-class classifiers may include the coarse machine learning one-class classifier and the plurality of training sets may include the first training set, and wherein the ensemble of models may include the plurality of coarse machine learning one-class classifiers.

In some embodiments, the processor may be further configured to apply the ensemble of models to the plurality of training sets to create the third training set representing the signal for the second stage of training, wherein applying the ensemble of models to the plurality of training sets may include applying the ensemble of models to the first training set.

In some embodiments, wherein the instructions that, when executed, may cause the processor to apply the ensemble of models to the plurality of training sets further may cause the processor to apply each particular classifier in the plurality of coarse machine learning one-class classifiers to each particular training set in the plurality of training sets; and apply the noise machine learning one-class classifier to each particular training set in the plurality of training sets.

In yet another aspect, there may be provided a computer-implemented method of fingerprinting a malicious behavior. The method may include, in a first stage of training, training a coarse machine learning one-class classifier to detect a first dataset of events, the first dataset of events including a dataset of events representing a malicious behavior and a dataset of events representing non-malicious behavior; and training a benign machine learning one-class classifier to detect a second dataset of events, the second dataset of events excluding the dataset of events representing malicious activity; applying an ensemble of models including the benign machine learning one-class classifier and the coarse machine learning one-class classifier to the first dataset of events to create a third training set representing the malicious behavior for a second stage of training; and training a final machine learning one-class classifier in the second stage of training using the third training set representing the malicious behavior, the final machine learning one-class classifier representing a fingerprint of the malicious behavior.

In some implementations, the method may further include applying the final machine learning one-class classifier to a sample dataset of events to assess whether the sample dataset of events includes the malicious behavior.

In some implementations, the method may further include collecting the second dataset of events when malware corresponding to the malicious behavior is not running or executing.

In some implementations, the first dataset of events may include a system call event trace.

In some implementations, the first dataset of events may include a system-wide trace including data corresponding to a plurality of non-malicious processes.

In some implementations, the final machine learning one-class classifier may be capable of determining, or configured to determine, whether data includes dataset of events regarding a category of malware behavior.

In some implementations, the final machine learning one-class classifier may be capable of detecting, or configured to identify, a category of malware associated with the malicious behavior.

In some implementations, the first dataset of events may include a sequence of events ordered based on process and threads information.

In some implementations, the third training set representing the malicious behavior for a second stage of training may include a sequence of events ordered based on at least process information associated with the sequence of events.

In some implementations, the final machine learning one-class classifier may be capable of detecting the malicious behavior in data including a non-malicious event associated with a software application, wherein the detection may be independent of the software application associated with the non-malicious event.

In another aspect, there may be provided a system for fingerprinting malicious behavior. The system may include a processor and a memory coupled to the processor and storing processor-readable instructions that, when executed, cause the processor to, in a first stage of training, train a coarse machine learning one-class classifier to detect a first dataset of events, the first dataset of events including a dataset of events representing a malicious behavior and a dataset of events representing non-malicious behavior; and train a benign machine learning one-class classifier to detect a second dataset of events, the second dataset of events excluding the dataset of events representing malicious activity; apply an ensemble of models including the benign machine learning one-class classifier and the coarse machine learning one-class classifier to the first dataset of events to create a third training set representing the malicious behavior for a second stage of training; and train a final machine learning one-class classifier in the second stage of training using the third training set representing the malicious behavior, the final machine learning one-class classifier representing a fingerprint of the malicious behavior.

In some embodiments, the processor may be further configured to apply the final machine learning one-class classifier to a sample dataset of events to assess whether the sample dataset of events includes the malicious behavior.

In some embodiments, the processor may be further configured to collect the second dataset of events when malware corresponding to the malicious behavior is not running.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the twits "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, reference may be made to the term "one-class classifier model". A one-class classifier may be a classifier that is trained to assess whether input to the classifier belongs to a particular class or not. In contrast, a binary classifier may assess whether input belongs to one of two different classes and a multi-class classifier may assess whether input belongs to one of a plurality of classes. For example, a binary classifier may predict whether input belongs to class X or class Y, whereas a one-class classifier may predict whether input belongs to class X or not and may not have any notion of class Y.

In the present application, reference may be made to the term "behavior". A behavior may refer to a way in which the computing device operates, functions or performs and may include the way in which a software module or script executing on the computing device operates, functions or performs. The behavior may be or include an activity, operation or event that occurs on the computing device and/or is caused or performed by a software module or script.

In the present application, reference may be made to the term "malicious behavior". A malicious behavior may refer to a malicious activity, operation or event that occurs on a computing device. A malicious activity, operation or event may include a harmful activity, operation or event that should be prevented from occurring on that computing device. A malicious behavior may cause or trigger one or more events to occur. In some embodiments, such events may be referred to as malicious events. In general, a malicious behavior refers to a behavior that is not permitted by the device manufacturer, the operating system provider, and/or an enterprise that manages the device.

A malicious behavior may include operations performed by the computing device as a result of an attack on the computing device carried out by an adversary or malicious actor, which may include a person or entity that is not authorized to use that computing device. The malicious behavior may correspond to, or be categorized based on, a category of attack. The category of an attack may be defined by the tactic, technique, and/or procedure (TTP) used by the malicious actor. Put another way, a TTP may identify or represent a pattern of behavior of an attack. A tactic may refer to an adversary's goal. A tactic may be implemented using one or more techniques and a technique may be implemented using one or more procedures. In general, the term "tactic" may refer to a high-level description of a technique and the term "technique" may refer to a high-level description of a procedure.

Example tactics are listed in the MITRE ATT&CK® knowledge base of adversary tactics and techniques and include a "Command and Control" tactic where the adversary is trying to communicate with a compromised computing system to control it, a "Discovery" tactic where the adversary is trying to figure out the environment of a computing system, an "Exfiltration" tactic where the adversary is trying to steal data, a "Privilege Escalation" tactic where the adversary is trying to gain higher-level permissions, a "Credential Access" tactic where the adversary is trying to steal account names and passwords, an "Execution" tactic where the adversary is trying to run malicious code and a "Reconnaissance" tactic where the adversary is trying to gather information they can use to plan future operations.

In the present application, reference may be made to the term "malware". Malware may refer to a software application or module or file, such as a script, that is intentionally harmful to a computing device and/or causes the computing device to operate, function or perform in a manner that should be prevented. Put another way, malware may intentionally cause the computing device to exhibit a defined malicious behavior. The malware may be associated with a specific category of attack and/or malicious behavior. Malware may include spyware, computer viruses, a MITRE ATT&CK® script that emulates a particular tactic, or the like.

Reference will now be made to FIG. 1, which diagrammatically illustrates an example system 100 in which methods and devices in accordance with the present description may be implemented. The system 100 includes in this example includes two client devices 102 and a remote server 104.

Although the client devices 102 and remote server 104 are depicted as being implemented by particular devices such as a laptop computer and a desktop computer, it will be understood that the devices 102 and remote server 104 may be implemented by one or more computing devices, including servers, personal computers, tablets, smartphones, Internet of Things (IoT) devices, or any other type of computing device that may be configured to store data and software instructions and execute software instructions to perform operations consistent with disclosed embodiments.

The system 100 further includes a network 106. The network 106 allows for communication between the client devices 102 and the remote server 104.

The client devices 102 may be configured to automatically collect and transmit data to the remote server 104. A client device may include a data collection agent configured to continuously monitor the behavior of the client device and collect data. In particular, the client devices 102 may transmit information regarding device behavior, digital media, or other data to the remote server 104 for storage, processing, analysis and/or monitoring of the client devices 102 by the remote server 104.

The remote server 104 may be configured to receive and respond to communications from the client devices 102. The remote server may be further configured to manage and/or control the client devices 102. For example, the remote server 104 may communicate commands or notifications to the client devices 102. In some embodiments, the remote server 104 may include multiple computing devices such as, for example, database servers, file transfer protocol (FTP) servers, and the like. More generally, the remote server 104 may include infrastructure that controls the client devices 102 and/or collects data from the client devices 102.

The remote server 104 may be further configured to ingest and aggregate data received from the client devices 102. The remote server 104 may also be configured to train a machine learning one-class classifier model and apply the one-class classifier model to data received from the client devices 102 in order to assess whether the received data includes a particular class of information.

Figure 2:
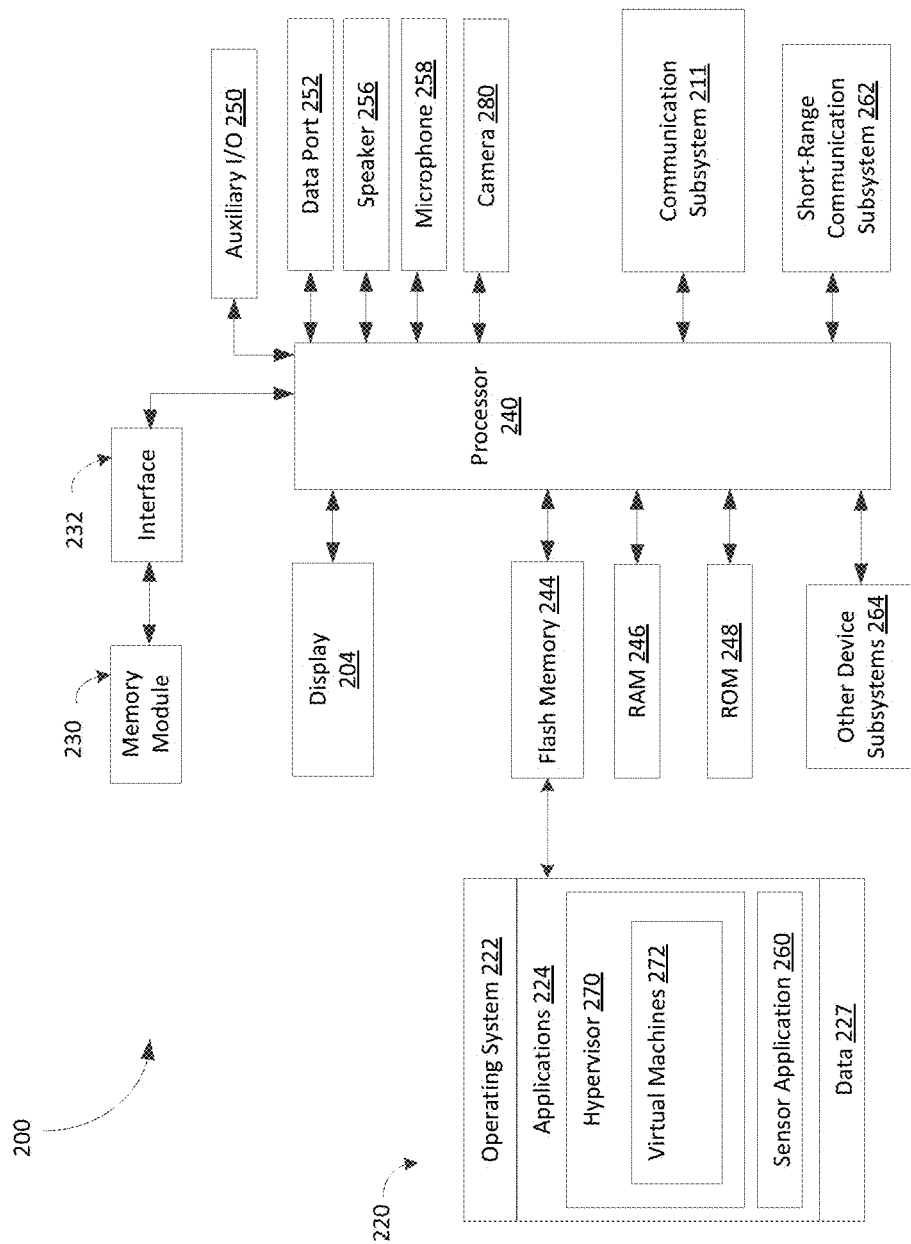
FIG. 2 is a block diagram illustrating components of example embodiments of the computing devices of FIG. 1.

Reference is made to FIG. 2, which illustrates a block diagram of an example embodiment of each particular computing device of FIG. 1, namely the client devices 102 and the remote server 104. In an example embodiment, the computing device 200 of FIG. 2 may be configured for two-way communication, having data and optionally voice communication capabilities, and the capability to communicate with other computer systems, e.g. via the internet. In some embodiments, the computing device 200 may take other forms, such as smartwatches, computers, tablets, laptops, or any other electronic device configured for connection over wireless networks.

The computing device 200 of FIG. 2 may include a housing (not shown) which houses components of the computing device 200. Internal components of the computing device 200 may be constructed on a printed circuit board (PCB). The computing device 200 includes a controller including at least one processor 240 (such as a microprocessor) which controls the overall operation of the computing device 200. The processor 240 interacts with device subsystems, such as a wireless communication subsystem 211, for exchanging radio frequency signals with a wireless network to perform communication functions. The processor 240 interacts with additional device subsystems including one or more input interfaces (which may include, without limitation, any of the following: one or more cameras 280, a keyboard, one or more control buttons, one or more microphones 258, a gesture sensor, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces (such as a display 204), one or more speakers 256, or other output interfaces), a short-range communication subsystem 262, and other device subsystems generally designated as 264.

In some example embodiments, the auxiliary input/output (I/O) subsystems 250 may include an external communication link or interface, for example, an Ethernet connection. The communication subsystem 211 may include other wireless communication interfaces for communicating with other types of wireless networks, e.g. Cellular, FLAN, WPAN, Bluetooth®, ZigBee®, Near Field Communications (NFC), and Radio Frequency Identification (RFID).

In some example embodiments, the computing device 200 also includes a removable memory module 230 (typically including flash memory) and a memory module interface 232. Network access may be associated with a subscriber or user of the computing device 200 via the memory module 230, which may be a Subscriber Identity Module (SIM) card for use in a cellular network (e.g., Global System for Mobile Communications (GSM), Universal Mobile Telecommunications Service (UMTS), Long-Term Evolution (LTE) or 5G) or other type of memory module for use in the relevant wireless network type. The memory module 230 may be inserted in or connected to the memory module interface 232 of the computing device 200.

The computing device 200 may store data 227 in an erasable persistent memory, which in one example embodiment is the flash memory 244. In some example embodiments, the data 227 may include service data having information required by the computing device 200 to establish and maintain communication with a wireless network. The data 227 may also include user application data such as messages (e.g. emails, texts, multimedia messages, etc.), address book and contact information, calendar and schedule information, notepad documents, image files, and other commonly stored user information stored on the computing device 200 by its users, and other data.

The data 227 stored in the persistent memory (e.g. flash memory 244) of the computing device 200 may be organized, at least partially, into a number of databases or data stores each containing data items of the same data type or associated with the same application. For example, identifiers may be stored in individual files within the computing device 200 memory.

The short-range communication subsystem 262 provides for communication between the computing device 200 and different systems or devices, which need not necessarily be similar devices. For example, the short-range communication subsystem 262 may include an infrared device and associated circuits and components, a wireless bus protocol compliant communication mechanism such as a Bluetooth® communication module to provide for communication with similarly-enabled systems and devices, and/or a near-field communication (NFC) interface.

The computing device 200 includes one or more cameras 280. The cameras 280 are configured to generate camera data, such as images in the form of still photographs and/or video data. The camera data may be captured in the form of an electronic signal which is produced by an image sensor associated with the cameras 280. More particularly, the image sensor is configured to produce an electronic signal in dependence on received light. The image sensor converts an optical image into an electronic signal, which may be output from the image sensor by way of one or more electrical connectors associated with the image sensor. The electronic signal represents electronic image data, which may be referred to as camera data.

A set of applications that control basic device operations, including data and possibly voice communication applications, may be installed on the computing device 200 during or after manufacture. Additional applications and/or upgrades to an operating system 222 or software applications 224 may also be loaded onto the computing device 200 through the wireless network, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory, e.g. in the flash memory 244. As illustrated in FIG. 2, the software modules 220 may include operating system software 222 and one or more applications 224 (or modules). The software modules 220 may be off-the-shelf or custom-built. A specific example of an application that may be resident on the computing device 200 includes a sensor application 260 for collecting or capturing data using sensors included in the computing device. The sensor application 260 may include a camera application for using the cameras 280 to capture one or more forms of digital media including images, videos and/or sound. Another specific example of an application that may be resident on the computing device 200 includes a hypervisor application 270.

The operating system software 222 may provide a file system for storing, modifying and accessing files held in the persistent memory (e.g. flash memory 244) of the computing device 200. This file system may be accessible to other programs running on the processor 240 via a programmatic interface provided by the operating system software 222. Specific examples of operating system software 222 include the Android™ operating system and the Windows™ operating system. The operating system software 222 may be proprietary or non-proprietary.

The hypervisor application 270 may manage and run one or more virtual machines 272. Each of the virtual machines 272 may include one or more software modules such as software modules 220.

Figure 3:
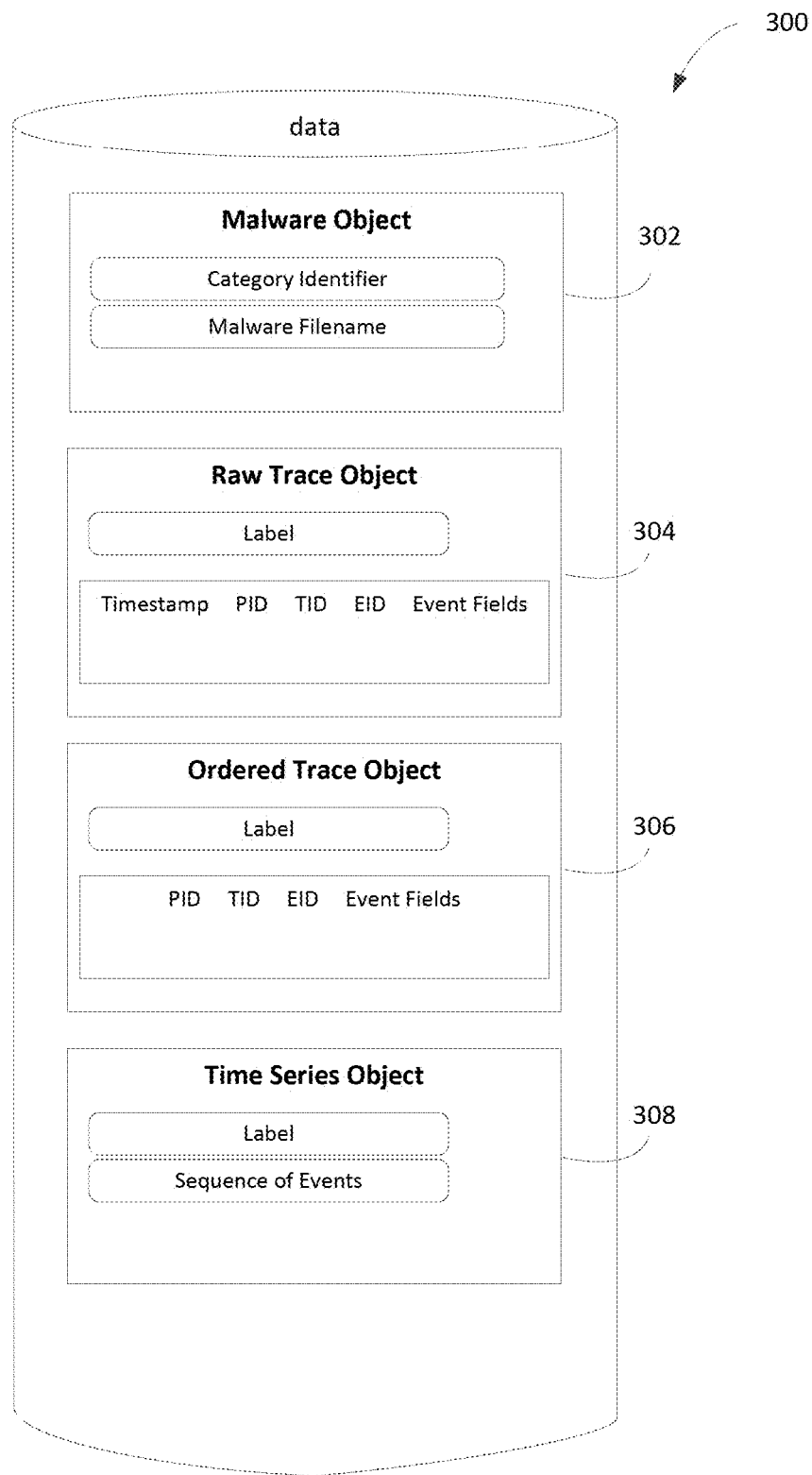
FIG. 3 shows, in block diagram form, an example data facility of a computing device.

Reference is now made to FIG. 3, which partially illustrates an example data facility 300 of a computing device. The data facility may be, for example, a flash memory 244 of the example computing device 200 of FIG. 2 or a data facility external the computing device. The computing device may be the remote server 104 of the example system 100 of FIG. 1. Not all components of the data facility 300 are illustrated.

The data facility 300 may store data regarding malware in a malware object 302. The malware object 302 may be a data structure and may include a category identifier representing a category of the malware. The identifier may, for example, represent or map to a particular attack category or to a malware family. Examples of malware families include MimiKatz, Dridex, and Kovter malware families.

The data facility 300 may store data regarding a trace in a raw trace object 304. The raw trace object 304 may be a data structure and may include a label and details of a sequence of trace events. In some embodiments, the label may correspond to an identifier of the malware associated with events included in the trace. For example, if the trace was gathered for the Kovter malware family, then the trace is labeled as Kovter. If the trace includes only noise, the label may indicate that the trace relates to noise.

Example details of a trace event include: a timestamp; a process identifier (PID) for a process that triggered or initiated the event; a thread identifier (TID) for a thread, within the process, that triggered the event; an event identifier (EID) for the event, which may include a name of a subsystem in which the event occurred and/or a name of the event; an event message; and event fields that may be used to populate variables in the message and provide details of an event.

A trace event may correspond to a system call. A system call may include a request, by a process and/or software module, to the operating system on which the process or software module is executing. The request may be regarding a service provided by the operating system and may be for the operating system to perform a hardware action on behalf of the process and/or software module. In other words, the service may include a service associated with hardware.

The trace event may include details of a system call. Example details include the type of system call and system call parameters passed to the operating system. Types of system calls may include file management, device management, information management and communication system calls. A file management system call may include a system call to create, delete, read, write, move or close a file. A device management system call may include a system call to request, release, read, write or reposition a device. The device may be or include a resource. A resource may include, for example, a physical device, such as a video card, or an abstract device, such as a file. An information management system call may include a system call for the time, date, or information about the operating system processes. A communication system call may include an interprocess communication system call for passing a message from one process to another process or for creating or gaining access to regions of memory owned by another process.

The raw trace object 304 may be pre-processed to create an ordered trace object 306 and a time series object 308. The ordered trace object 306 may be a sorted form of the raw trace object 304, which may in turn be used to create a time series object 308 to be used to train a one-class classifier model. The label included in a set of associated raw trace, ordered trace and time series objects may be the same and used to perform supervised learning of one-class classifier models.

Figure 4:
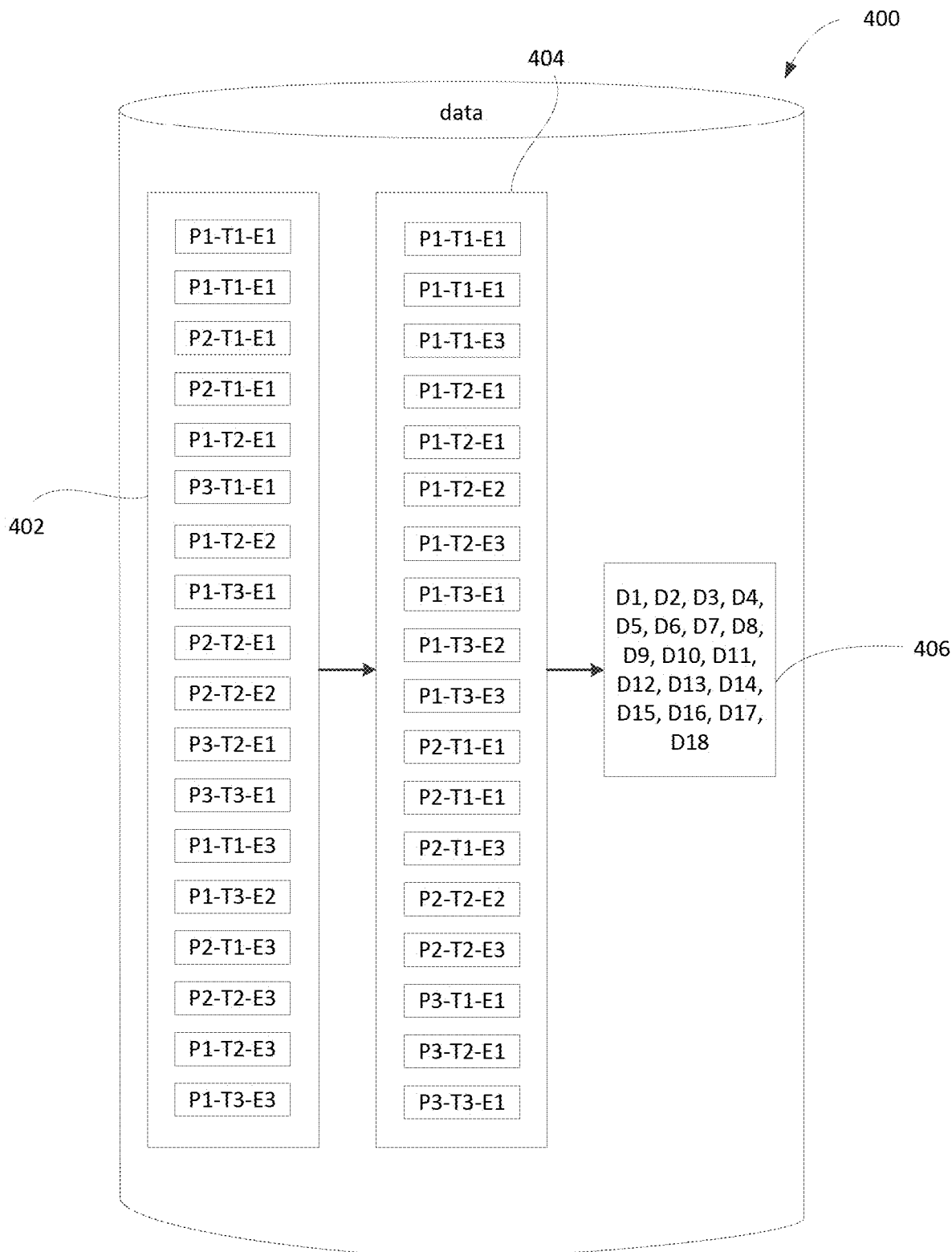
FIG. 4 diagrammatically shows an example of training data in various stages of pre-processing.

Reference is now made to FIG. 4 which diagrammatically shows an example of training data 400 in various stages of pre-processing. The training data 400 may include a raw dataset 402, a reordered dataset 404 and a time series dataset 406. The raw dataset 402 may be pre-processed to create the reordered dataset 404 and the time series dataset 406. The reordered dataset 404 may be a sorted form of the raw dataset 402, which may in turn be used to create the time series dataset 406 to be used to train a one-class classifier model.

As shown, the raw dataset 402 includes a sequence of simplified trace events listed in chronological order. Each particular trace event in the sequence of events may be represented by a string, such as, for example, "P1-T1-E1", which may represent a dash separated tuple including a process identifier, thread identifier, and an event type. The raw dataset 402 may be in a human-readable format or in a binary format. The trace events may include additional details, such as system call parameters. The raw dataset 402 includes events from a plurality of process and threads that are interleaved and mingled.

The sequence in the raw dataset 402 may be reordered to create a reordered dataset 404. More particularly, the raw dataset 402 may be sorted based on processes and threads associated with the processes. More particularly, the events in the raw dataset 402 may be sorted by process identifier and then sorted by thread identifier on a process identifier basis. In other words, the raw dataset 402 may be transformed from a time-ordered sequence into a process and thread ordered sequence in the form of reordered dataset 404. The sorting should be performed in a manner that maintains the order of events within a thread.

It will be understood that, although the same thread identifier (e.g. "T1") may be shown in FIG. 4 in association with different processes (e.g. "P1" and "P2"), the threads associated with a particular process are distinct from the threads associated with another threads of another process. The thread identifier "T1", for example, may refer to a first thread associated with a particular process. In other words, thread identifiers may be reused across different processes. A thread may be uniquely identified at the system level using the combination of the process identifier and the thread identifier.

By sorting the raw dataset 402 based on process and thread, a final model may be trained that is agnostic to software application scheduling variations of events on the system that gathered the raw dataset 402.

The reordered dataset 404 may be used to create the time series dataset 406 that is in a form suitable for training a one-class classifier model. Each particular event in the reordered dataset 404 may correspond to a particular data point in the time series dataset 406. In the example dataset 406, the string "D1" in the time series dataset 406 may represent a particular data point. The time series dataset 406 may have a fixed time window. Each particular window of time may include, for example, ten events.

Figure 5:
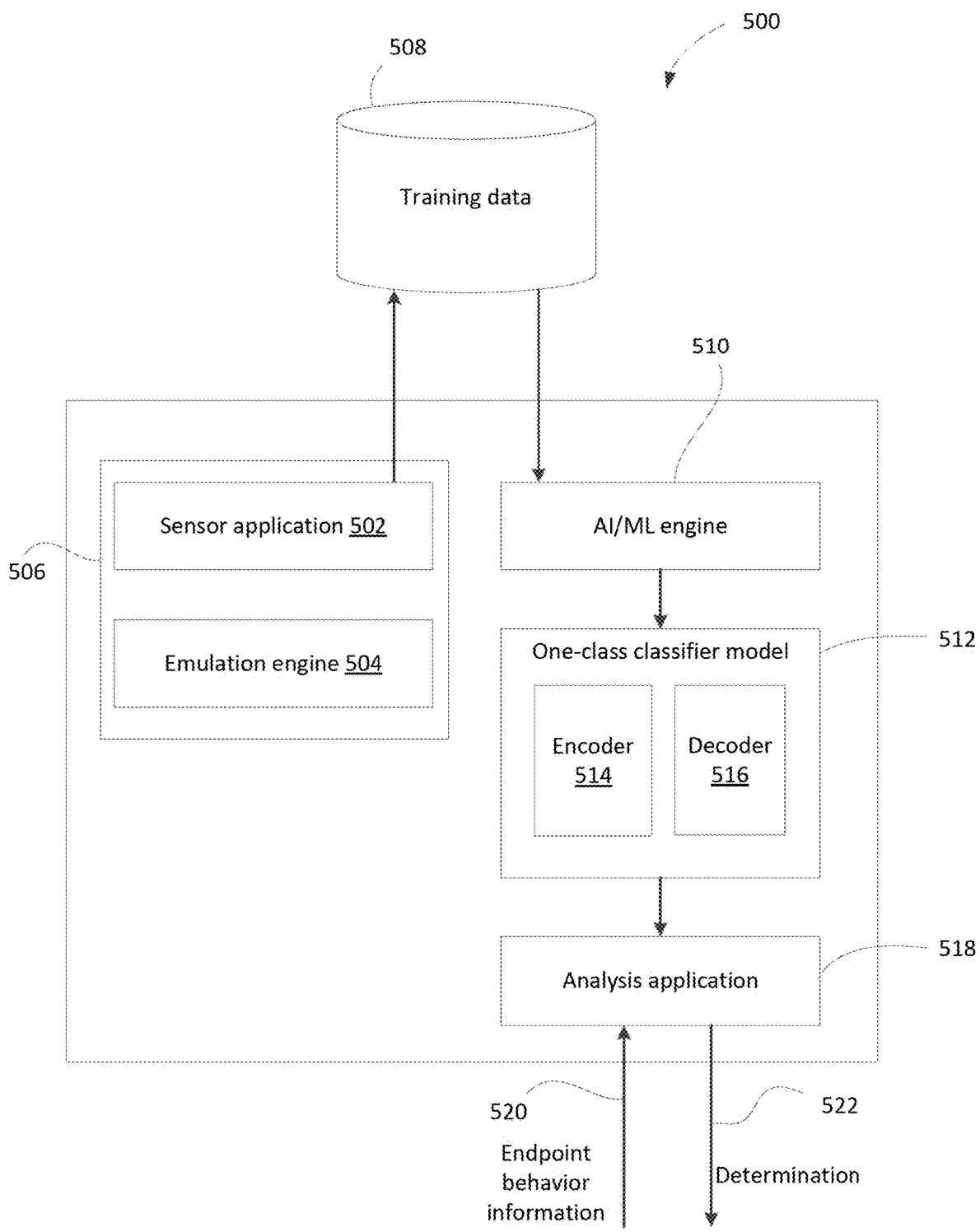
FIG. 5 is a block diagram illustrating an simplified example computing device 500 in which methods and devices in accordance with the present description may be implemented.

Reference is now also made to FIG. 5, which illustrates a simplified example computing device 500 in which methods and devices in accordance with the present description may be implemented. The computing device 500, in some examples, may be configured to train a one-class classifier based on impure data and apply the one-class classifier to data to determine whether or not the data is of a particular class. The computing device 500 be or include the remote server 104 in the example system 100 described in FIG. 1.

The computing device 500 may, in some instances, include a sensor application 260 for collecting or capturing information. The information gathered by the sensor application 260 may be stored in a raw form as training data 508.

In one example, the sensor application 502 includes a monitoring application for monitoring the behavior of the computing device. Put another way, the monitoring application may monitor activity on the computing device. For example, the sensor application 502 may include a trace facility for collecting event information indicating the behavior of a software module running on the computing device 200.

The trace facility may be a proprietary or non-proprietary application or a command provided by an operating system. Using the example of a Linux system, a command such as "sysdig" may be used to a listing of trace events including system call events and other system level events, providing a set of system-level information. Using the example of a Windows™ system, the Event Tracer for Windows™ (ETW) may be used to collect kernel or application-defined events to a log. Another example includes Blackberry™ Optics.

The trace facility may be configurable to collect "process-specific" information or "system-wide" information. The term process-specific information may refer to information that is restricted to corresponds to a particular process. On the other hand, the term system-wide information may refer to information which corresponds to processes across the computing device and is not restricted to a particular process. Put another way, a system-wide trace may collect event information across a system and is not restricted to a specific instance of a running software application. A system-wide trace may list a plurality of events, such as system calls, that are triggered by a plurality of processes.

The computing device 500 may, in some instances, include an emulation engine 504 configured to run malware. In other words, the emulation engine 504 triggers a defined malicious behavior to occur on the computing device 500. In general, the emulation engine 504 modifies the behavior of the computing device 500 and/or causes one or more processes, or a plurality of processes, to perform one or more computing events, such as, for example, system calls, to occur.

The computing device 500 may include a virtual machine 506. The virtual machine 506 may run its own operating system, sometimes referred to as a "virtual" or "guest" operating system. The virtual machine 506 may be used to run malware in a safe, sandboxed environment. Since the virtual machine 506 is separated from the rest of the host computing device 500, the software running the virtual machine 506 should not compromise the host computing device 500. More particularly, the virtual machine 506 includes the emulation engine 504 in order to sandbox malicious behavior when the emulation engine 504 installs and/or runs malware.

The virtual machine 506 also includes the sensor application 502 in order to collect information regarding the behavior of the virtual machine 506 when infected with the malware. The sensor application 502 may gather normal system-wide behaviour in addition to malicious behaviour.

The collected information may include malicious trace data as well as benign (i.e. non-malicious) trace data. The malicious trace data may include one or more malicious raw traces collected while the malware is running and/or while the computing device 500 exhibits malicious behavior associated with the malware. The benign trace data may include one or more benign raw traces collected while the malware is not running and/or while the computing device 500 does not exhibit malicious behavior associated with the malware.

The malware may be run one or more times in the virtual machine 506. In some embodiments, a new instance of the virtual machine 506 is created for each run of the malware. In this way, each time the malware runs, it does so in a clean "uninfected" operating environment. A single "malicious" raw trace may be collected each time the malware is run. The "benign" trace should be collected in an operating environment, such as a new instance of the virtual machine 506, in which the malware has been installed or run in order to ensure that no malicious trace events are included in the benign traces.

A malicious raw trace may be referred to as "impure" data or "contaminated" data, as it may include not only a trace event associated with the malware but also an unwanted trace event that is not associated with the malware. Put another way, the contaminated trace data may include information regarding benign behavior in addition to malicious behavior. The trace events associated with the malware are sometimes referred to as the "signal" and other trace events are sometimes referred to as "noise".

The raw traces may be stored as training data 508 in the form of a log, which may be, for example, a file.

The training data 508 may include a significant amount of noise. The term "noise" may refer to information that is not of interest, unwanted information, and/or information that would negatively impact the training of accuracy or performance of the one-class classifier model 512. In some embodiments, the training data may be in the form of event information including indicia of a category of behavior, such as, for example, a set of malicious events associated with a particular attack tactic.

In some implementations, the computing device 500 may not include the virtual machine 506, the emulation engine 504 and/or the sensor application 502, and the training data 508 may be generated by another device using some other process.

The computing device 500 includes an artificial intelligence or machine learning engine 510 that is capable of receiving training data 508. The training data 508 may be received in a raw form and pre-processed by the machine learning engine 510 into a time-series form suitable for training a one-class classifier model 512.

The machine learning engine 510 implements a two-stage training process. In general, in the first stage of training, two types of datasets should be used. A first type may be labelled/tagged data that includes noise and a signal for which a final model is developed. A second type may include a noise dataset that may be used in noise suppression. For instance, to build a final model corresponding to a "Command and Control" tactic, the first type of dataset may include one or more contaminated (i.e. noise and signal) traces associated with the "Command and Control" tactic and the second type of dataset may include benign (i.e. noise) traces. In the second stage of training, a refined (i.e. signal) dataset may be used for training the final model.

In some embodiments, in a first stage of training, the machine learning engine 510 is configured to output a one-class classifier model 512 for each raw trace collected by the virtual machine 506. In a second stage of training, the machine learning engine 510 is configured to output a final one-class classifier model 512 trained using a refined dataset created by applying an ensemble of the one-class classifiers trained in the first stage of training. A final one-class classifier model 512 may be trained to detect a behavior and is sometimes referred to as a fingerprint of the behavior. In some embodiments, the behavior is associated with malware. For example, the final model may be trained to detect a behavior corresponding to a particular tactic. In that case, the final model may be referred to as a fingerprint of the tactic.

The computing device 500 includes a one-class classifier model 512. It will be appreciated that, although a single model is shown in FIG. 5 for ease of illustration, the machine learning engine 510 may train many one-class classifier models 512. As shown, the one-class classifier model 512 includes a machine learning neural network auto-encoder-decoder. An auto-encoder-decoder is a neural network that learns to encode and decode automatically. The auto-encoder-decoder may be a long short-term memory (LSTM) auto-encoder-decoder and include an encoder 514 and a decoder 516. The encoder 514 may encode input into encoded form by transforming a high-dimensional input into a lower-dimensional format. The decoder 516 may read and decode the encoded state. Put another way, the encoder 514 reduces the dimensions of input data so that the original information is compressed. The decoder 516 recreates or decompresses the original input information from the compressed data. In this way, models learns to map input to output, and captures correlations between data points or events, such that the input of the model may be the same as the output during training. The input to the one-class classifier model 512 may be labeled training data. Training data may be fed into the one-class classifier model 512 as a sequence of events on a per process and per thread basis.

The computing device 500 includes an analysis engine 518 capable of receiving endpoint behavior information 520 in real-time. An endpoint may be or include one of the client devices 102 in the example system 100 described in FIG. 1. The endpoint behavior information 520 may include one or more traces collected on the endpoint. The analysis engine 518 may use the final one-class classifier to continuously analyze endpoint activity to detect malware and other threats. The analysis engine 518 may apply the final model to endpoint behavior information 520 to determine whether the endpoint behavior information 520 belongs to a particular class. For example, the particular class may be a category of behavior that may, for example, correspond to a particular attack tactic. The computing device 500 may transmit the result of the determination 522 to the endpoint.

Many of the embodiments described herein focus on detecting malicious behavior. However, it is understood that the present application is not limited to such embodiments and that the embodiments described generally can easily be extended to detect non-malicious behavior. For example, if the final model should be a fingerprint of a particular non-malicious behavior that should be monitored, then the emulation engine 504 may execute a non-malicious software application that causes a non-malicious behavior rather than execute malware. Traces or other indicia of the non-malicious behavior may be collected and used in the first stage of training.

Many of the embodiments described herein focus on fingerprinting behavior. However, it is understood that the present application is not limited to such embodiments and that the embodiments described generally can easily be extended to fingerprints in other fields. As an example, the computing device 500 may be configured for use in the field of traffic monitoring. Training data may be collected in the form of digital media including images and/or video. A first training dataset may be collected that includes cars (i.e. a signal) and non-car activity (noise) such as individuals walking on the road or objects such as birds flying in the air. A second training dataset including only non-car activity may also be collected. The two types of datasets may be used in the first stage of training in order to create a refined dataset representing cars. The refined dataset may be used to train a final model that represents a car fingerprint. More generally, the final model may be a fingerprint of a particular object represented in one or more forms of digital media including images, videos and/or sound.

Figure 6:
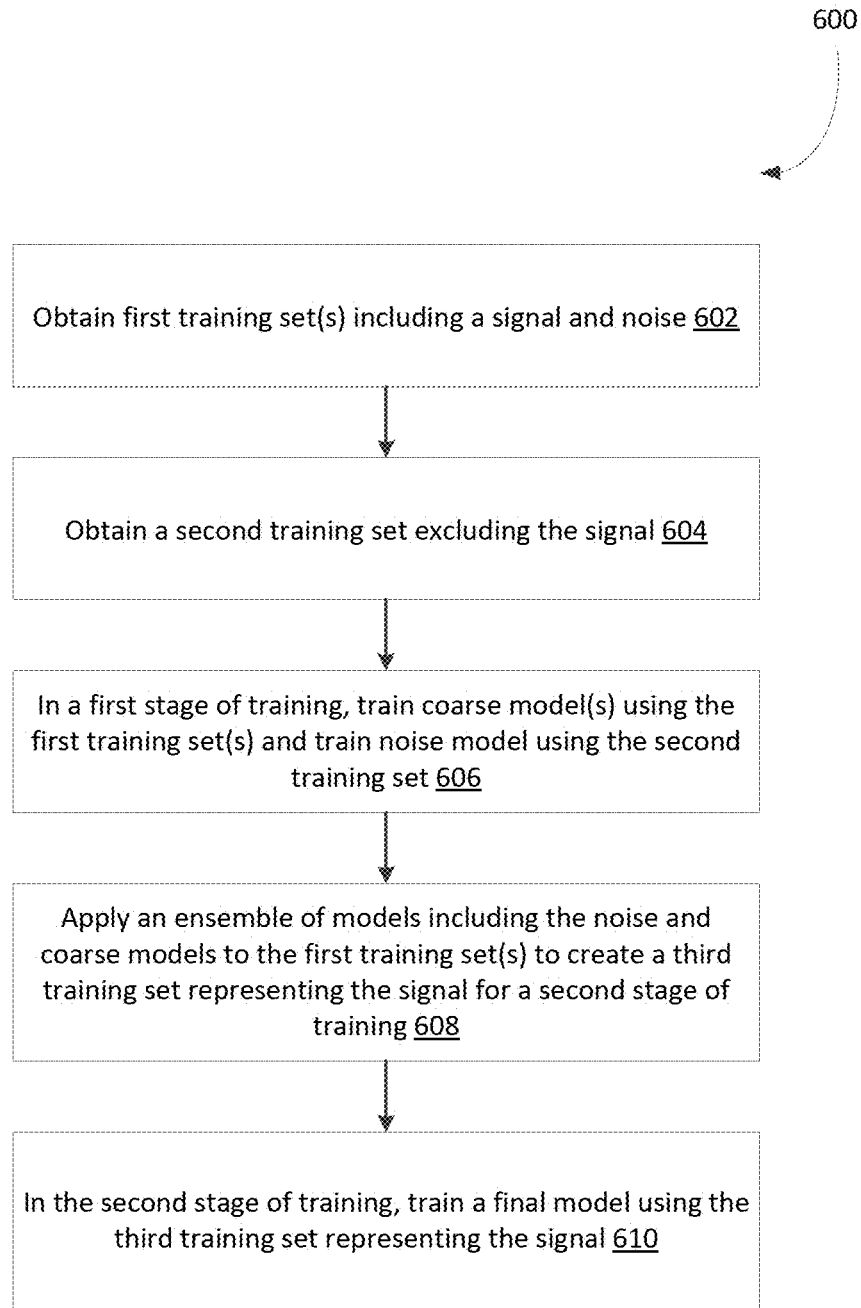
FIG. 6 shows a flowchart of a simplified example method of developing a neural network model.

Reference will now be made to FIG. 6, which shows, in flowchart form, a simplified example of a method 600 of training a neural network model based on impure data. The example method 600 may be implemented by one or more computing devices suitably programmed to carry out the functions described. In this example method 600, the computing device may be implemented by the remote server 104 in the example system 100 described in FIG. 1.

The method 600 includes two stages of training. In a first stage of training, an ensemble of models are trained using a group of training sets. At least one of the training sets in the group of training sets may include a signal and noise. At least one of the training sets in the group of training sets may include only noise. Each particular model in the ensemble of models is trained using a respective training set in the group of training sets. In this way, a model is created for each particular training set in the group of training sets. The ensemble of models is applied to each particular training set in the group of training sets that includes a signal in order to create a refined training set representing the signal. In the second stage of training, a final model is trained using the refined training set created by applying the ensemble of models.

In operation 602, the computing device obtains a first training set including a signal and noise. The first training set may, for example, be associated with digital media or a trace. In some embodiments, the computing device may enable system-wide tracing and execute malware in order to collect system call events relating to the malware (i.e. the signal) in a raw trace. The raw trace may include system call events that are not caused by or otherwise associated with the malware (i.e. noise). The raw trace may then be pre-processed in a time series form suitable for training a one-class classifier. The first training set may be or include the pre-processed raw trace. In some embodiments, the malware may be executed multiple times and each time the malware is executed a separate trace that includes the same signal and possibly different noise may be generated. In other words, the noise in the plurality of the contaminated training sets may vary from one particular training set to another.

In operation 604, the computing device obtains a second training set. The signal that is included in the first training set may be excluded from the second training set. In some embodiments, the second training set may be obtained by collecting a trace while the malware is not executing or causing the computing device to generate system calls associated with the malware. In other words, the second training set may be gathered while the computing device idles.

In operation 606, in a first stage of training, the computing device trains a coarse machine learning one-class classifier model using the first training set and trains a noise machine learning one-class classifier model using the second training set. In some embodiments, the computing device trains a plurality of coarse machine learning one-class classifier models. Each particular classifier in the plurality of coarse classifiers may be trained using a respective one of the plurality of contaminated training sets. The coarse machine learning one-class classifier model that is trained using the first training set may be included in the plurality of coarse classifiers.

In operation 608, the computing device applies an ensemble of machine learning one-class classifier models to the first training set to create a third training set representing the signal for a second stage of training. The ensemble of models may include the noise machine learning one-class classifier model and the coarse machine learning one-class classifier model. In some embodiments, the ensemble of models may include the plurality of coarse classifiers.

In operation 610, in a second stage of training, the computing device trains a final model using the third training set representing the signal. The term "final" does not imply that no further models may be trained by the computing device. Rather, it merely indicates that the model is one that is trained in the second stage of training. The final model may instead be referred to as, for example, a "second stage" model.

In this way, a final robust supervised learning model may be trained to detect an anomaly based on impure data. While supervised learning auto-encoder-decoder models typically may not be well suited to anomaly detection since the quality of these models may depend on the quality of the training data rather than the quality of training data, the use of two stages of training may facilitate the development of a robust auto-encoder-decoder model even when only a small amount of impure labeled training data is available.

Moreover, the method 600 provides an approach for training a supervised learning model using a system-wide trace. This may be particularly useful in situations where system-wide traces are required in order to capture the interaction of malware with other processes. The method 600 does not assume the presence of pure traces and does not require malware traces gathered only for specific malware processes.

Figure 7:
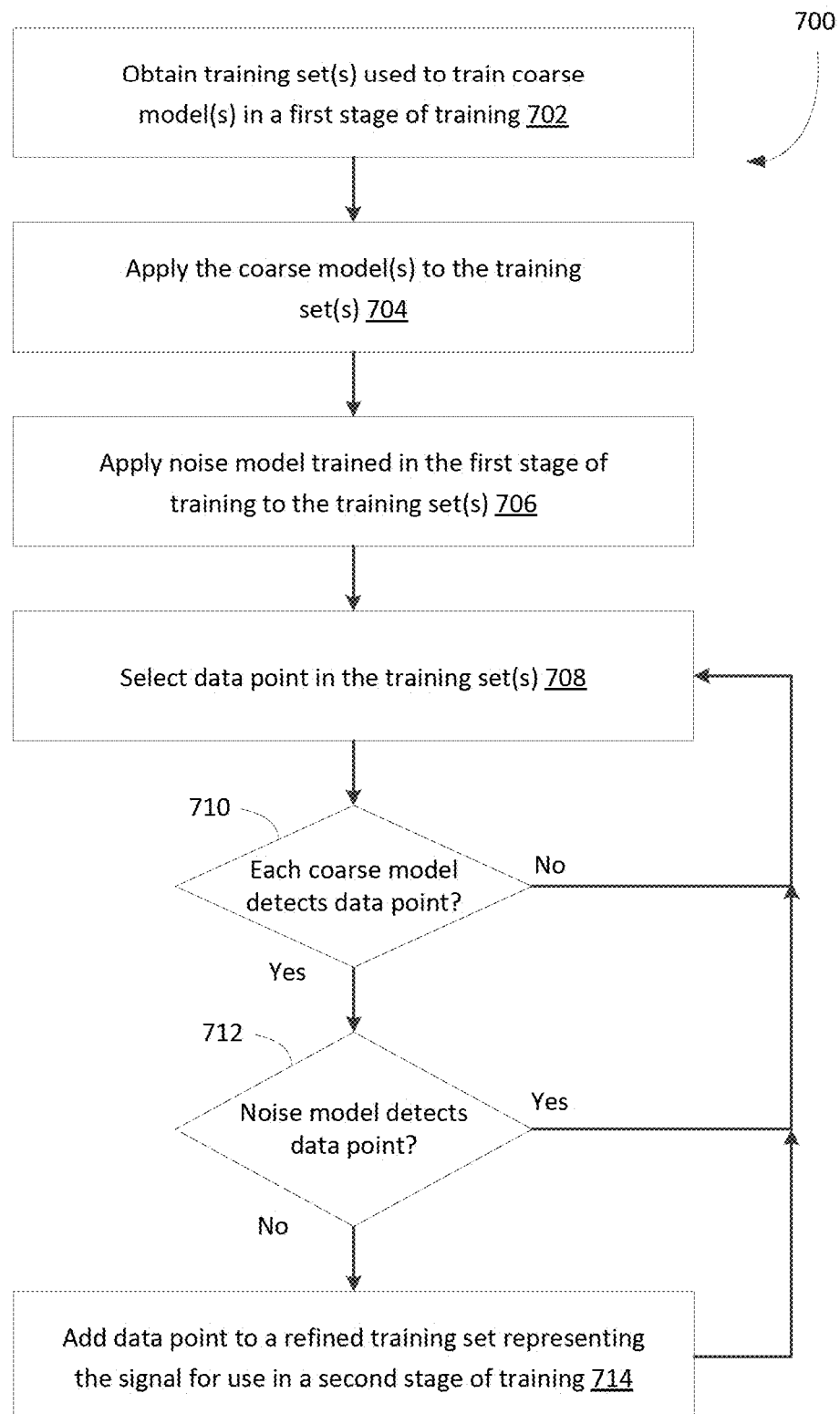
FIG. 7 shows a flowchart of a simplified example method of create a refined training set.

Reference will now be made to FIG. 7, which shows, in flowchart form, a simplified example method 700 of create a refined training set. The method 700 may correspond to the operation 608 in the method 600 in FIG. 6. The example method 700 may be implemented by one or more computing devices suitably programmed to carry out the functions described. In this example method 700, the computing device may be implemented by the remote server 104 in the example system 100 described in FIG. 1.

In operation 702, the computing device obtains the training sets used to train coarse models in a first stage of training. The training sets may correspond to the first training set or the plurality of training sets described in the method 600 of FIG. 6. Each training set may include a sequence of data points. In some embodiments, there may be a single contaminated training set that was used to train a single coarse model or there may be a plurality of contaminated training sets that were used to train a corresponding set or plurality of coarse models, where each particular coarse model in the plurality of coarse models is trained using a respective training set in the plurality of training sets. In other words, a computing device may obtain a group of one or more training sets used to train a group of one or more coarse models, each training set corresponding to a respective one of the group of coarse models. In some embodiments, the computing device obtains only a subset (e.g. one or more) of training sets used to train coarse models in the first stage of training.

In operation 704, the computing device applies each coarse model to each obtained training set. In other words, each training set is sequentially fed into each coarse model. Each training set may include a sequence of data points that are fed into each coarse model.

In operation 706, the computing device applies a noise model trained in the first stage of training to each obtained training set. In other words, each training set is sequentially fed into the noise model.

In operation 708, the computing device selects a particular data point fed into each coarse model, starting with the first data point of the first training set that was fed into each coarse model, in order to determine whether the particular data point should be added to a refined dataset.

In operation 710, the computing device determines whether the particular data point is detected by each coarse model. When a data point is inputted into a particular coarse model, the particular coarse model produces a corresponding output. If that output matches the inputted training point, then the coarse model is considered to have detected that data point.

If each of the coarse training models does not detect the particular data point, then the computing device may not add the particular data point to the refined dataset and may in operation 708 select the next data point in the sequence of data points that was fed into each coarse model in order to determine whether the next data point should be added to the refined dataset.

If each coarse training model detects the particular data point, then the computing device may in operation 712 determine whether the particular data point is detected by the noise model. When a data point is inputted into the noise model, the noise model produces a corresponding output. If that output matches the inputted training point, then the noise model is considered to have detected that data point.

If the noise model detects the particular data point, then the computing device may not add the particular data point to the refined dataset and the computing device may in operation 708 select the next data point in the sequence of data points that was fed into each coarse model in order to determine whether the next data point should be added to the refined dataset.

If the noise model does not detect the particular data point, then in operation 714, that particular data point is added to the refined dataset. The computing device may then in operation 708 select the next data point in the sequence of data points that was fed into each coarse model in order to determine whether the next data point should be added to the refined dataset.

It is understood that the operations 708, 710, 712 and 714 may be performed for each of the data points fed into the coarse models and the noise model. In this way, the noise that may be present in the contaminated training sets may be filtered from the training sets to create a refined dataset.

Figure 8:
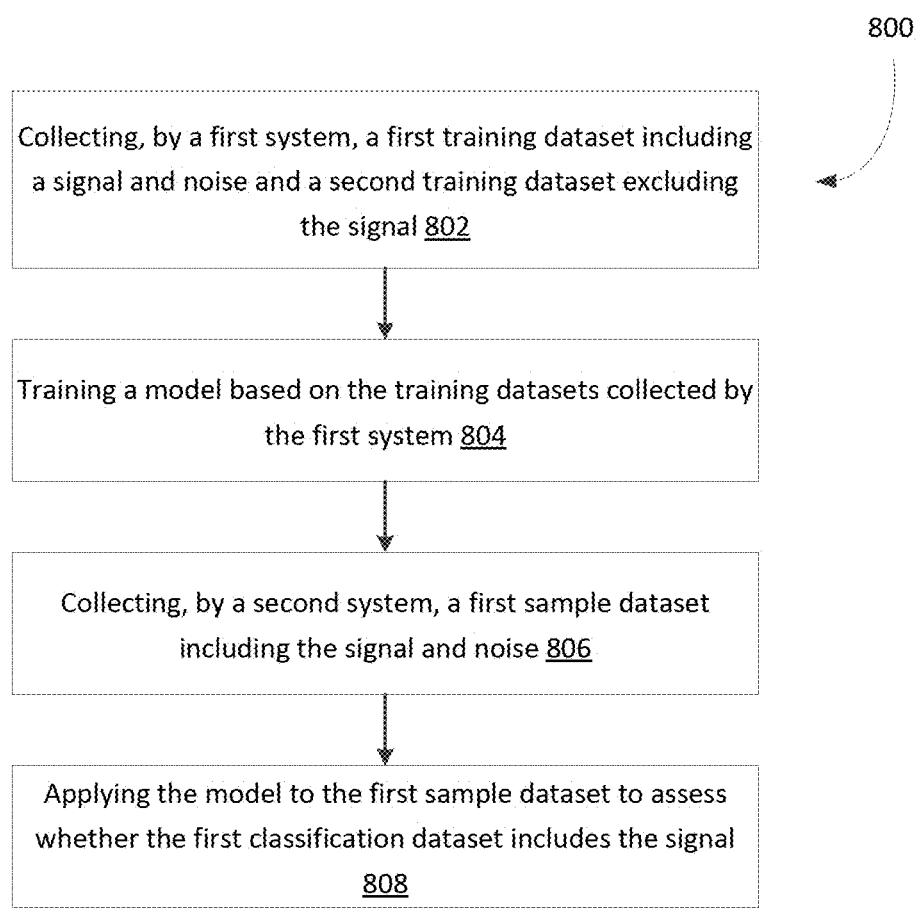
FIG. 8 shows a flowchart of a simplified example method of detecting a signal in impure data.

Reference will now be made to FIG. 8, which shows, in flowchart form, a simplified example of a method 800 of detecting a signal in impure data. The example method 800 may be implemented by one or more computing devices and/or servers suitably programmed to carry out the functions described.

The example method 800 refers to three separate computing systems that collect datasets. A computing system may be or include a computing device and/or a virtual machine installed on a computing device. In this example method 800, the first computing system may be implemented by a virtual machine installed on the remote server 104 in the example system 100 described in FIG. 1 and the second computing systems may be implemented by a separate client device in the plurality of client devices 102 in the example system 100 described in FIG. 1.

A computing system may include one or more installed software modules. In some cases, a software module is an operating system software or an application. A software module may be off-the-shelf software or custom-built software. The two computing systems in the example method 800 may each include a different set of installed and running software modules. For instance, the first computing system may be running a Windows™ 10 operating system and the second computing system may be running an Android™ operating system.

In operation 802, a first computing system collects a first training dataset including a signal and a first noise training dataset and also collects a second training dataset including a second noise training dataset and excluding the signal. The first noise training dataset or the second noise dataset may include a noise training data item or event associated with a first software module installed on the first computing system. For instance, the first noise data item may correspond to a system call invoked by a running instance of the first software module.

In operation 804, a computing device trains a final machine learning one-class classifier based on the first and second training datasets. The model may be trained, for example, by the remote server 104 in the example system 100 described in FIG. 1 and according to the method 600 of FIG. 6. Since method 600 of FIG. 6 filters out noise from the training set used to train the final machine learning one-class classifier, the final machine learning one-class classifier may be agnostic to the system from which the training sets, which in some embodiments include traces, are generated. Accordingly, in some embodiments, the final machine learning one-class classifier may be capable of detecting a malicious behaviour in data including a non-malicious event associated with a software application, with the detection being independent of the software application associated with the non-malicious event.

In operation 806, a second computing system collects a first sample dataset including the signal and a first sample noise dataset. The first sample noise dataset may not include data included in the second training noise dataset, and vice versa. For example, the first sample noise dataset may not include the first noise data item.

In operation 808, a computing device applies the final machine learning one-class classifier to the first sample dataset to determine whether the first classification dataset includes the signal. The determination may be made independent of the particular software application that is associated with only noise and not the signal.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to other above-described operations.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Certain adaptations and modifications of the described embodiments can be made. Therefore, the above discussed embodiments are considered to be illustrative and not restrictive.

What is claimed is:

1. A computer-implemented method of fingerprinting a malicious behavior, the method comprising:
   in a first stage of training:
      training a coarse machine learning one-class classifier to detect a first dataset of events, the first dataset of events including a dataset of events representing a malicious behavior and a dataset of events representing non-malicious behavior; and
      training a benign machine learning one-class classifier to detect a second dataset of events, the second dataset of events excluding the dataset of events representing the malicious behaviour;
   applying an ensemble of models including the benign machine learning one-class classifier and the coarse machine learning one-class classifier to the first dataset of events to filter out one or more events in the second dataset of events from the first dataset of events to create a third training set representing the malicious behavior for a second stage of training; and
   training a final machine learning one-class classifier in the second stage of training using the third training set representing the malicious behavior, the final machine learning one-class classifier representing a fingerprint of the malicious behavior.

2. The method of claim 1, further comprising applying the final machine learning one-class classifier to a sample dataset of events to assess whether the sample dataset of events includes the malicious behavior.

3. The method of claim 1, further comprising collecting the second dataset of events when a malware corresponding to the malicious behavior is not running.

4. The method of claim 1, wherein the first dataset of events includes a system call event trace.

5. The method of claim 1, wherein the first dataset of events includes a system-wide trace including data corresponding to a plurality of non-malicious processes.

6. The method of claim 1, wherein the final machine learning one-class classifier is trained to determine whether data includes dataset of events regarding a category of malware behavior.

7. The method of claim 1, wherein the final machine learning one-class classifier is trained to detect a category of malware associated with the malicious behavior.

8. The method of claim 1, wherein the first dataset of events includes a sequence of events ordered based on process and threads information.

9. The method of claim 1, wherein the third training set representing the malicious behavior for a second stage of training includes a sequence of events ordered based on at least process information associated with the sequence of events.

10. The method of claim 1, wherein the final machine learning one-class classifier is capable of detecting-trained to detect the malicious behavior in data including a non-malicious event associated with a software application, the detection being independent of the software application associated with the non-malicious event.

11. A system for fingerprinting a malicious behavior, the system comprising:
a processor;
a memory storing processor executable instructions that, when executed by the processor, cause the processor to:
in a first stage of training:
train a coarse machine learning one-class classifier to detect a first dataset of events, the first dataset of events including a dataset of events representing a malicious behavior and a dataset of events representing non-malicious behavior; and
train a benign machine learning one-class classifier to detect a second dataset of events, the second dataset of events excluding the dataset of events representing the malicious behaviour;
apply an ensemble of models including the benign machine learning one-class classifier and the coarse machine learning one-class classifier to the first dataset of events to filter out one or more events in the second dataset of events from the first dataset of events to create a third training set representing the malicious behavior for a second stage of training; and
train a final machine learning one-class classifier in the second stage of training using the third training set representing the malicious behavior, the final machine learning one-class classifier representing a fingerprint of the malicious behavior.

12. The system of claim 11, wherein the instructions, when executed, further cause the processor to apply the final machine learning one-class classifier to a sample dataset of events to assess whether the sample dataset of events includes the malicious behavior.

13. The system of claim 11, wherein the instructions, when executed, further cause the processor to collect the second dataset of events when a malware corresponding to the malicious behavior is not running.

14. The system of claim 11, wherein the first dataset of events includes a system call event trace.

15. The system of claim 11, wherein the first dataset of events includes a system-wide trace including data corresponding to a plurality of non-malicious processes.

16. The system of claim 11, wherein the final machine learning one-class classifier is trained to determine whether data includes dataset of events regarding a category of malware behavior.

17. The system of claim 11, wherein the final machine learning one-class classifier is trained to detect a category of malware associated with the malicious behavior.

18. The system of claim 11, wherein the first dataset of events includes a sequence of events ordered based on process and threads information.

19. The system of claim 11, wherein the third training set representing the malicious behavior for a second stage of training includes a sequence of events ordered based on at least process information associated with the sequence of events.

20. A non-transitory computer-readable storage medium storing processor-executable instructions to fingerprint a malicious behavior, wherein the processor-executable instructions, when executed by a processor, are to cause the processor to:
in a first stage of training:
train a coarse machine learning one-class classifier to detect a first dataset of events, the first dataset of events including a dataset of events representing a malicious behavior and a dataset of events representing non-malicious behavior; and
train a benign machine learning one-class classifier to detect a second dataset of events, the second dataset of events excluding the dataset of events representing the malicious behaviour;
apply an ensemble of models including the benign machine learning one-class classifier and the coarse machine learning one-class classifier to the first dataset of events to filter out one or more events in the second dataset of events from the first dataset of events to create a third training set representing the malicious behavior for a second stage of training; and
train a final machine learning one-class classifier in the second stage of training using the third training set representing the malicious behavior, the final machine learning one-class classifier representing a fingerprint of the malicious behavior.

* * * * *